United States Patent [19]
Fukui et al.

[11] Patent Number: 5,429,871
[45] Date of Patent: * Jul. 4, 1995

[54] REVERSIBLY COLOR-CHANGING SHAPED MATERIAL AND PROCESS FOR PRODUCING THE SAME

[75] Inventors: Yuichi Fukui; Hajime Itoh; Shigeki Hagura; Itsumi Muraoka, all of Hiroshima, Japan

[73] Assignee: Mitsubishi Rayon Co., Ltd., Tokyo, Japan

[*] Notice: The portion of the term of this patent subsequent to Oct. 12, 2010 has been disclaimed.

[21] Appl. No.: 49,393

[22] Filed: Apr. 21, 1993

Related U.S. Application Data

[62] Division of Ser. No. 778,155, Dec. 19, 1991, Pat. No. 5,252,396.

[30] Foreign Application Priority Data

Apr. 25, 1990 [JP] Japan ................................. 2-107446

[51] Int. Cl.⁶ ............................................ D02G 3/00
[52] U.S. Cl. ............................... 428/373; 428/370; 428/310.5; 428/317.9; 428/318.4; 428/315.5; 428/913; 428/304.4
[58] Field of Search ................ 526/245; 264/165; 428/373, 310.5, 317.9, 318.4, 319.1, 913, 370, 315.5, 304.4

[56] References Cited

U.S. PATENT DOCUMENTS

| | | | |
|---|---|---|---|
| 4,299,880 | 11/1981 | Arens | 428/315.5 |
| 4,312,916 | 1/1982 | Kakumara et al. | 428/345 |
| 4,769,273 | 8/1988 | Hoeschele et al. | 428/913 |
| 4,994,314 | 2/1991 | Rosenfeld et al. | 428/36.92 |
| 5,019,062 | 2/1991 | Ryan et al. | 428/323 |
| 5,234,766 | 8/1993 | Fukui et al. | 428/373 |
| 5,248,470 | 9/1993 | Dollinger et al. | 264/171 |
| 5,252,396 | 10/1993 | Fukui et al. | 428/373 |
| 5,264,531 | 11/1993 | Fukui et al. | 526/245 |

*Primary Examiner*—Patrick J. Ryan
*Assistant Examiner*—N. Edwards
*Attorney, Agent, or Firm*—Oblon, Spivak, McClelland, Maier & Neustadt

[57] ABSTRACT

The present invention relates to a shaped material consisting of a layer having open microvoids (hereinafter referred to as light-scattering layer) and a layer having a hue different from that of the light-scattering layer (hereinafter referred to as color-developing layer), the light-scattering layer constituting at least part of the outer surface of the shaped material and the color-developing layer constituting the rest of the shaped material, which shaped material changes its color reversibly depending upon its moist or dry condition, as well as to a process for producing said shaped material.

7 Claims, No Drawings

REVERSIBLY COLOR-CHANGING SHAPED MATERIAL AND PROCESS FOR PRODUCING THE SAME

This application is a divisional of application Ser. No. 07/778,155, filed Dec. 19, 1991, U.S. Pat. No. 5,252,396, which was filed as International Application No. PCT/JP91/00545 on Apr. 24, 1991.

TECHNICAL FIELD

The present invention relates to a shaped material such as fiber, film or the like, which changes its color reversibly depending upon its moist or dry condition, as well as to a process for producing said shaped material.

BACKGROUND ART

There are many reports on researches made with a view to increasing the sensitivity of a shaped material, for example, a fiber, and various techniques are disclosed. It is well known that the development of, in particular, a chromatic fiber capable of changing its color depending upon the external environment is in an advanced stage. A typical example thereof is a fiber which responds to temperature, light, etc.

Used therein is a technique of combining a fiber with a material inherently having a chromatic function (e.g. a thermochromic acrylic fiber obtained from a polymer mixed with a thermochromic granular material, disclosed in Japanese Patent Application Kokai Laid-Open) No. 62-184114), and there are very few examples of a technique of imparting a color-changing function to a fiber per se.

As the example of, in particular, a technique of endowing a fiber with a function of changing its color depending upon its moist or dry condition, there can be mentioned at best a method of mixing a fiber with cobalt ion. This method has problems in that the color-changing function is markedly reduced owing to the falling-off of the material having said function and further the speed of color change response is low.

DISCLOSURE OF THE INVENTION

The present inventors made research in order to develop a shaped material which per se has substantially permanently a function of changing its color depending upon its moist or dry condition and which has a high speed of response. As a result, the present inventors has completed the present invention.

The present invention relates to a shaped material consisting of a layer having open microvoids (hereinafter referred to as light-scattering layer) and a layer having a hue different from that of the light-scattering layer (hereinafter referred to as color-developing layer), the light-scattering layer constituting at least part of the outer surface of the shaped material and the color-developing layer constituting the rest of the shaped material, which shaped material changes its color reversibly depending upon its moist or dry condition.

The open microvoids refer to a microvoid structure generated by ordinary wet coagulation and mean contiguous voids of 10Å–10,000Å in average pore diameter communicating with each other.

As the materials constituting the light-scattering layer and the color-developing layer, an acrylonitrile polymer is used ordinarily.

In the present invention, the light-scattering layer constitutes part or the whole of the outer periphery of a fiber or a film. That is, in the cross-section perpendicular to the lengthwise direction the fiber or the cross-section of the film, the light-scattering layer constitutes part or the whole of the circumference of the cross-section.

In the shaped material having this structure, a light incoming from outside is scattered by the light-scattering layer when the material is dry, and consequently the hue of the light-scattering layer is perceived; however, the hue of the portion of the color-developing layer covered by the light-scattering layer cannot be perceived. When the shaped material is moist, however, the microvoids of the light-scattering layer are filled with water and consequently the light-scattering layer loses the light-scattering ability. In this case, since the incoming light can reach as far as the color-developing layer via the light-scattering layer, both of the hue of the light-scattering layer and the hue of the color-developing layer are perceived even if the color-developing layer is covered by the light-scattering layer. As a result, the shaped material has a hue completely different from the hue perceived when dry. When the shaped material changes from a moist condition to a dry condition, a completely opposite color change takes place. The above color change process is reversible. Thus, the shaped material of the present invention is a novel material whose color change principle is completely different from those of conventional materials.

Moreover, the present shaped material such as fiber, film or the like, unlike those shaped materials to which a color-changing material has been added, has by itself a function as mentioned above and accordingly can maintain the function substantially permanently.

The hues of the light-scattering layer and the color-developing layer can be imparted by a known method such as solution dyeing, wherein a spinning solution is dyed before spinning, dyeing or the like. The imparting of a hue to the light-scattering layer, however, is not always necessary.

As can be easily appreciated from the above principle, as the refractive index of the light-scattering layer is closer to that of water, the color of the color-developing layer is more distinct when the shaped material is moist, and this is preferable. Accordingly, the refractive index of the polymer constituting the light-scattering layer is preferably 1.35–1.50.

The polymer constituting the color-developing layer (hereinafter referred to as constituent polymer of color-developing layer) and the polymer constituting the light-scattering layer (hereinafter referred to as constituent polymer of light-scattering layer) are preferably of same type in view of close contact and adhesivity between the two layers, but may be of different types. When the two constituent polymers are of different types, it is preferable in view of the close contact and adhesivity that at least part of the monomer components of the constituent polymer of light-scattering layer be the same as most abundant monomer component of the constituent polymer of color-developing layer and that the constituent polymer of light-scattering layer be a copolymer of the above monomer with a comonomer copolymerizable therewith.

As the process for producing the shaped material of the present invention such as fiber, film or the like, a so-called wet process is preferable. This is because voids appropriate for the light-scattering layer of the shaped material of the present invention can be easily formed in the coagulation step for coagulating a polymer solution using a coagulant, depending upon the coagulation conditions.

Accordingly, an acrylonitrile polymer is suited for use in the production of the shaped material of the present invention such as fiber, film or the like, and is used preferably.

In order to make easy the formation of voids in the light-scattering layer, it is preferable to use a copolymer of acrylonitrile with a monomer copolymerizable with acrylonitrile, having a hydrophobic group. As the hydrophobic group, there can be mentioned a halogen, a halogenated alkyl group and the like. Use of fluorine as the halogen is particularly preferable in order to allow the polymer of the light-scattering layer to have a refractive index close to that of water.

When an acrylonitrile polymer is used for the color-developing layer and a copolymer of acrylonitrile with fluorinated methacrylate is used for the light-scattering layer, it is presumed that the voids of the light-scattering layer cannot be filled with water owing to the water repellency even when the resulting shaped material is moist. Actually, however, color change was perceived clearly. Such a phenomenon could not have been anticipated at all.

The specific process for producing the shaped material of the present invention, particularly a fiber is as follows:

A fiber is produced by:

subjecting, to wet conjugate spinning, a solution (A) obtained by dissolving and dispersing 10–30 parts by weight of a polymer composed of 50 mole % or more of acrylonitrile and 50 mole % or less of a comonomer having a hydrophobic group, copolymerizable with acrylonitrile and 0.3 part by weight or less of a pigment (Pa) in 70–90 parts by weight of a solvent capable of dissolving said polymer, and a solution (B) obtained by dissolving and dispersing 15–30 parts by weight of a polymer composed of 80 mole % or more of acrylonitrile and 20 mole % or less of a comonomer having a hydrophilic group, copolymerizable with acrylonitrile and 0.001–0.3 part by weight of a pigment (Pb) having a hue different from that of the pigment (Pa) in 70–85 parts by weight of a solvent capable of dissolving said polymer, with the solution (A) being arranged at least at part of the circumference of the hole for polymer solution discharging, of the spinneret used, to obtain a coagulated yarn in a coagulating solution of 20°–70° C. which is a 40/60–70/30 (weight ratio) mixed solution of the solvent used in the solution (A) or (B) and water, drawing the coagulated yarn with a draw ratio of 2 or more while washing it in water of 20°–80° C. and drying the resulting yarn at 150° C. or below.

Incidentally, when a film is produced, the object can be achieved by using an extruder die for film in place of the spinneret for conjugate spinning and conducting film shaping in place of the fiber shaping.

The solution (A) is for formation of the light-scattering layer. When there is used a copolymer composed of 50 mole % or more of acrylonitrile and 50 mole % or less of a comonomer having a hydrophobic group, fine voids are easily formed during coagulation in so-called wet spinning.

As the comonomer having a hydrophobic group, there can be mentioned, for example, vinyl chloride, vinylidene chloride, vinyl fluoride, vinylidene fluoride, trifluoroethyl (meth)acrylate, fluoroalkyl (meth)acrylates and the like, and mixtures of two or more of them.

Meanwhile, as the refractive index of the light-scattering layer is closer to that of water, the color-developing layer has a more distinct color when the shaped material is moist. Fluorine-containing monomers are preferable because they have an action for reducing the refractive index of the copolymer. Of these, fluoroalkyl (meth)acrylates are particularly preferable comonomers because their copolymerization with acrylonitrole is conducted in an easy procedure, and there can be mentioned 2,2,2-trifluoroethyl (meth)acrylate, 1H,1H,5H-octafluoropentyl (meth)acrylate, 1H,1H,2H,2H-heptadecafluorodecyl (meth)acrylate and the like.

The content of said comonomer is restricted owing to the solubility, spinnability, adhesivity with color-developing layer, etc. of the resulting copolymer, and is preferably 50 mole % or less based on the total amount of acrylonitrile and the comonomer.

The light-scattering layer has a light-scattering ability as the basic function. Depending upon the utilization purpose of the color change of the shaped material caused by the change of its humidity (moist or dry) condition, it is possible to carry out an original dyeing which means dyeing in advance. In this case, however, the content of the pigment (Pa) is 0.3% by weight or less based on the polymer used in the solution (A) in view of the spinnability of the solution (A).

As the solvent used in the solution (A), there can be mentioned organic solvents such as dimethylacetamide, dimethylformamide, dimethyl sulfoxide, ethylene carbonate, γ-butyrolactone and the like, and inorganic solvents such as aqueous nitric acid solution, aqueous sodium thiocyanate and the like.

The constituent polymer of color-developing layer is preferably the same as the constituent polymer of light-scattering layer in view of the close contact and adhesivity between the color-developing layer and the light-scattering layer. In view of the color-developing principle, however, said layer is preferably a dense layer. Accordingly, the constituent polymer of color-developing layer is preferably an acrylonitrile homopolymer or a copolymer composed of 80 mole % or more of acrylonitrile and 20 mole % or less of a monomer having a hydrophilic group, copolymerizable with acrylonitrile. Examples of the hydrophilic group include a hydroxyl group, an amide group, a carboxyl group, a sulfonic group, a carbonyl group and the like. Examples of the monomer include hydroxyethyl methacrylate, acrylamide, acrylic acid, and the like.

Further, the color-developing layer must be tinted in a hue different from that of the light-scattering layer. When the light-scattering layer is not tinted, any pigment other than the white pigment can be selected freely and, when the light-scattering layer is tinted with a pigment (Pa), a pigment (Pb) having a hue different from that of the pigment (Pa) is selected.

As examples of the pigment, there can be mentioned azo type Red, benzoimidazoline type Red, azo type Yellow, Phthalocyanine Blue, etc.

These materials are dissolved in a solvent to obtain a solution (B). The solvent may be the same as used in the solution (A) or different therefrom.

In view of the color change principle, the fiber produced according to the process of the present invention changes its color clearly when the polymer concentration in the solution (A) is relatively low. Accordingly, it is preferable to prepare the solution (A) by dissolving 10–30 parts by weight of a polymer and 0.3 part by weight or less of a pigment (Pa) in 70–90 parts by weight of a solvent capable of dissolving said polymer. Meanwhile, the solution (B) must be able to form a dense fiber layer and therefore it is preferable to prepare the solution (B) by dissolving 15-30 parts by weight of a polymer and 0,001-0.3 part of a pigment (Pb) having a hue different from that of the pigment (Pa) in 70-85 parts by weight of a solvent capable of dissolving said polymer.

Next, wet conjugate spinning is conducted by arranging the solution (A) at least at part of the circumference of the hole for polymer solution discharging, of the spinneret used. As the method therefor, there can be mentioned, for example, core-sheath conjugate spinning and side-by-side conjugate spinning.

As the coagulating solution used therein, there is preferred, also for making large the void ratio of the light-scattering layer, a 40/60-70/30 (weight ratio) mixed solution of the solvent used in the solution (A) or (B) and water, having a temperature of 20°-70° C.

The conjugated yarn obtained is drawn with a draw ratio of 2 or more while washing it in water of 20°-80° C., and dried at 150° C. or below. By taking care for the washing and drying steps not to encounter high temperatures, the coagulated yarn can efficiently maintain the intended structure of the light-scattering layer.

The shaped material of the present invention changes its color reversibly by changing the moist or dry condition to a reverse condition.

BEST MODE FOR CARRYING OUT THE INVENTION

The present invention is hereinafter described by way of Examples. In the following Examples, parts refer to parts by weight.

Example 1

Wet conjugate spinning was conducted in a coagulating solution, i.e. a 45/55 (weight ratio) mixed solution of water/dimethylacetamide by arranging, at the sheath portion, a solution obtained by dissolving 18 parts of a 80/20 (weight ratio) copolymer of acrylonitrile and 1H,1H,2H,2H-heptadecafluorodecyl methacrylate in 82 parts of dimethylacetamide and, at the core portion, a solution obtained by dispersing and dissolving 0.02 part of Phthalocyanine Blue and 20 parts of a polyacrylonitrile in 79.98 parts of dimethylacetamide.

The resulting undrawn yarn was washed in hot water of 50° C. and simultaneously drawn with a draw ratio of 5 to obtain a core-sheath conjugate fiber of 3 μm in sheath thickness and 15 μm in core diameter. This fiber was white when dry, turned blue when moist and, when dried again, became white.

Example 2

Wet conjugate spinning was conducted in a coagulating solution, i.e. a 45/55 (weight ratio) mixed solution of water/dimethylacetamide by arranging, at the sheath portion, a solution obtained by dissolving 18 parts of a 75/25 (molar ratio) copolymer of acrylonitrile and vinylidene chloride in 82 parts of dimethylacetamide and, at the core portion, a solution obtained by dispersing and dissolving 0.02 part of Phthalocyanaine Blue and 20 parts of a polyacrylonitrile in 79.98 parts of dimethylacetamide.

The resulting undrawn yarn was washed in hot water of 50° C. and simultaneously drawn with a draw ratio of 5 to obtain a core-sheath conjugate fiber of 3 μm in sheath thickness and 15 μm in core diameter. This fiber was white when dry, turned blue when moist, and when dried again, became white.

Example 3

Wet composite film shaping was conducted in a coagulating solution, i.e. a 45/55 (weight ratio) mixed solution of water/dimethylacetamide using a slit nozzle, by arranging, at the sheath portion, a solution obtained by dissolving 19 parts of a 85/15 (molar ratio) copolymer of acrylonitrile and trifluoroethyl acrylate in 81 parts of dimethylacetamide and, at the core portion, a solution obtained by dispersing and dissolving 0.02 part of benzoimidazoline type Red and 20 parts of a polyacrylonitrile in 79.98 parts of dimethylacetamide.

The resulting unstretched film was washed in hot water of 50° C. and simultaneously stretched with a stretch ratio of 3 to obtain a continuous core-sheath composite film of 5 μm in sheath thickness, 15 μm in core thickness and 10 cm in width. This film was white when dry, turned red when moist and, when dried again, became white.

We claim:

1. A shaped polymer material having an outer surface wherein the shaped polymer material consists of a light scattering layer having open microvoids and a first hue and a color-developing layer having a second hue different from said first hue of said light scattering layer, wherein said light scattering layer constitutes part or a whole of the outer surface of the shaped polymer material and is a copolymer of acrylonitrile and a copolymerizable comonomer having a hydrophobic group and said color-developing layer constitutes the rest of the shaped material and is an acrylonitrile homopolymer or copolymer containing at least 80 mol % of acrylonitrile, wherein said shaped polymer material changes its color reversibly depending on moisture content of said light scattering layer, such that when said light scattering layer is dry, only said first hue of said light scattering layer is perceived on said part or whole of the outer surface constituted by said light scattering layer, and when said light scattering layer is sufficiently wet to fill said open microvoids with water, both of said first hue of said light scattering layer and said second hue of said color developing layer are perceived on said part or whole of the outer surface constituted by said light scattering layer.

2. A shaped material according to claim 1, which is a film.

3. A shaped material according to claim 1, wherein the hydrophobic group is a halogen or a halogenated alkyl group.

4. A shaped material according to claim 3, wherein the comonomer having a hydrophobic group is at least one selected from the group consisting of vinyl chloride, vinylidene chloride, vinyl fluoride, vinylidene fluoride, trifluoroethyl (meth)acrylate, and fluoroalkyl (meth)acrylates.

5. The shaped material according to claim 1, wherein said shaped material is a fiber.

6. The shaped material according to claim 1, wherein said light-scattering layer has a refractive index of from 1.35 to 1.50.

7. The shaped material according to claim 1, wherein said light-scattering layer and said color-developing layer are made of the same polymer.

* * * * *